Patented Jan. 20, 1942

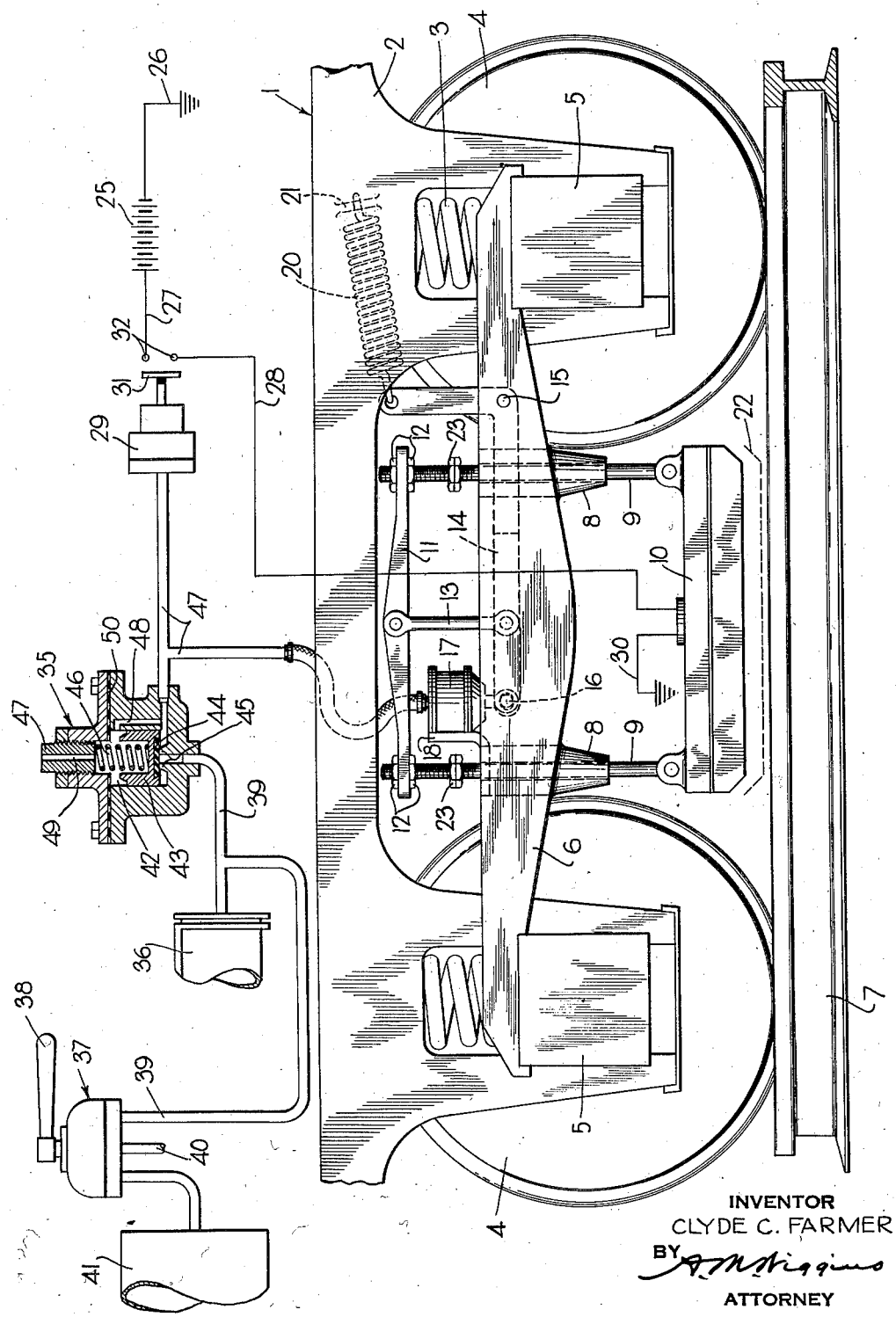

2,270,425

UNITED STATES PATENT OFFICE 2,270,425

TRACTION INCREASER APPARATUS

Clyde C. Farmer, Pittsburgh, Pa., assignor to The Westinghouse Air Brake Company, Wilmerding, Pa., a corporation of Pennsylvania Application November 28, 1940, Serial No. 367,483

4 Claims. (Cl. 303—3)

This invention relates to traction increaser apparatus for railway vehicles, wherein devices are employed to increase the traction between the vehicle wheels and the rails on which they roll at the time the vehicle brakes are applied to decelerate the vehicle.

In recent years there have been designed and put into operation a number of trains comprising light weight cars intended for operation at extremely high speeds. In order to stop these high speed trains in a reasonably short distance high braking power is required. In many instances the braking power which must be applied to produce the desired stop is in excess of that which is permitted by the adhesion between the vehicle wheels and the rails. In order to obtain the necessary adhesion it has heretofore been proposed to employ what is termed traction increaser devices, also sometimes referred to as traction booster devices.

These traction increaser or booster devices are usually in the form of electromagnetic devices which when operative are held suspended a very short distance, as for example one-fourth or three-eighths of an inch, above a track rail and maintained energized so as to produce a strong magnetic pull on the vehicle trucks toward the rail. In this manner the traction between the vehicle wheels and the rails is very appreciably increased.

Heretofore, the proposals for the employment of such traction increaser devices have contemplated that the devices would be so mounted as to at all times be held positioned a short distance above the track rails, viz., the one-fourth to three-eighths inch heretofore mentioned. When these devices are maintained in such close proximity to the rails at all times there is a danger that they may be torn loose from their moorings by striking obstructions along the track-way. For example, when crossing switches or frogs, particularly on curves or bends, the traction increaser devices may strike guard rails or the like and thus be torn loose from their supports.

The traction increaser devices need be operative only at the time the vehicle brakes are applied. Since this is so, these devices could very well be held in a position a substantial distance above the rails at all times when the vehicle brakes are released. The traction increaser devices would of course be ineffective to perform their function in this raised position but if means are provided to lower them to their effective positon just above the rail at the time the brakes are applied there would be an increased assurance that they would be available for operation at the time when needed.

Operation of the traction increaser devices is not required during all applications of the brakes. Obviously if the brake application is a light one the additional adhesion provided by these devices is not required. Therefore, it is desirable that means be provided whereby the traction increaser devices are held in their inoperative position well above the track rails at all times except when the degree of brake application is such that the additional adhesion provided by these devices is necessary in order to stop the vehicle or train in a short distance without producing sliding of the vehicle wheels.

With the foregoing in mind, it is an object of the present invention to provide an improved traction increaser apparatus in which the traction increaser devices are normally held in an ineffective position well above the track rail and which are operated to their effective position just above the rail only when the brakes are applied to a predetermined degree where the additional adhesion provided by these devices is required.

Other objects of the invention, dealing with the provision of specific constructions, will be apparent from the following description, which is taken in connection with the attached drawing illustrating in the single figure thereof one form that the invention may take.

Referring to the attached drawing, I have represented in diagrammatic form by the numeral 1 a portion of a railway vehicle truck. This truck comprises at each side thereof one side frame member 2 mounted by means of springs 3 on axles carrying wheels 4 through the medium of journal boxes 5. The elements just enumerated are intended to be representative of the more or less conventional types of railway vehicle trucks commonly used. For simplicity, one side only of the truck has been shown but it will be understood that each side of each truck will be similar.

According to the invention, a bar or frame member 6 is mounted at each side of each truck upon two adjacent and longitudinally spaced journal box members 5, as is apparent from the drawing, so that this member is spaced from a track rail 7, upon which the wheels 4 roll, a predetermined fixed distance. This distance does not vary to an appreciable extent while the vehicle is moving or at rest.

The frame member 6 is provided with two lugs 8 extending downwardly therefrom, each being apertured to pass a suspension rod 9. The lower end of each suspension rod is pivotally connected to a magnetic traction increaser device 10. This device is intended to be of conventional construction, and as is well known resembles the usual magnetic track brake device.

The upper ends of the suspension rods 9 are threaded and are fastened to a yoke member 11 by nuts 12. Intermediate its ends the yoke 11 has connected thereto a link 13, the other end of which is connected to one arm of a bell crank lever 14. The knee of the bell crank lever 14 is pivotally mounted on the member 6 at 15.

As will be observed, the horizontal arm of the bell crank lever 14 is pivotally connected at 16 to a piston rod extending from a pressure operated cylinder device 17. This cylinder device is mounted on the member 6 by means of a bracket 18.

The shorter vertical arm of the bell crank lever 14 is connected to one end of a coil spring 20, the other end of the spring being connected to a lug 21 on the truck frame 2. It will be observed that the coil spring 20 is effective to maintain the traction increaser device 10 in a raised position above the track rail 7. This position is preferably one where the device 10 is unlikely to engage any obstructions along the track-way.

The device 10 may be lowered to its effective or operative position, indicated by the dotted line 22, upon supply of fluid under pressure to the cylinder device 17 to a degree sufficient to overcome the opposing force of spring 20. The effective position of the device 10 is determined by engagement of nuts 23 with the upper surface of the member 6, as will be apparent from the drawing.

The traction increaser device 10 will of course be effective only when it is energized. Thus I have shown a battery 25 as representing a source of current supply for this purpose. One terminal of the battery is shown grounded at 26 while the other terminal is connected to a circuit comprising conductors 27 and 28 leading to the device 10 through contacts of a pneumatic switch device 29. The return circuit from the device 10 is by way of its ground connection 30.

The pneumatic switch device 29 may be of conventional design, such as that comprising a piston or diaphragm operative upon supply of fluid under pressure to the device to cause engagement of movable contact 31 with stationary contacts 32, to close the circuit to the traction increaser device 10.

In order that the traction increaser device may be operated to its effective position, and energized in that position, only when the brakes have been applied to a predetermined degree, I have shown an interlocking arrangement with a brake system. This interlocking arrangement comprises essentially a valve device 35. Before describing this valve device however, I wish to refer to the diagrammatic representation of the air brake system illustrated in the drawing.

As illustrated, I have shown a brake cylinder device 36 as representing one or more of the customary brake cylinder devices of a fluid pressure brake system for actuating the brakes on the vehicle. The fluid pressure brake system also comprises a brake valve device 37 having a handle 38. This brake valve device may be of any of the conventional types commonly known but for simplicity I have illustrated it as of the well-known rotary type. In this type the handle is provided with release, application and lap positions. In the release position the brake valve device maintains pipe 39 leading to the brake cylinder 36 connected to an exhaust pipe 40 to thereby maintain the brake cylinder 36 vented to the atmosphere. In application position of the handle 38 the communication just described is broken and the pipe 39 is connected to reservoir 41, which represents a source of fluid under pressure. In lap position, the brake cylinder pipe 39 is isolated from both the exhaust pipe 40 and the reservoir 41.

Referring now to the valve device 35, this device is embodied in a casing provided with a bore 42 in which is disposed a piston type valve 43. This valve is provided on its lower face with a composition insert 44 arranged to engage valve seat 45. A spring 46 acting between an adjustable plug 47 and the upper face of the piston valve 43 urges the piston valve to the seated position illustrated.

The piston valve 43 controls communication between brake cylinder pipe 39 and piping 47 leading to both the pneumatic switch device 29 and the cylinder device 17. When the piston valve 43 is in the position shown it maintains the pneumatic switch device 29 and the cylinder device 17 connected to the atmosphere via a communication which includes the piping 47, a passage 48, the upper portion of bore 42, and an exhaust passage 49 in the plug 47. When fluid under pressure is produced below the piston valve 43, within the confines of the seat 45, to a degree sufficient to overcome the opposing force of spring 46, the piston valve will lift from seat 45 and upon exposure of its full area to the pressure therebelow will move with a snap action to its extreme upper position, where it seals against a gasket 50. In this upper position the atmospheric communication previously described is closed and the piping 47 is connected to the brake cylinder pipe 39.

In order that the switch device 29 and the cylinder device 17 shall not be operated until a predetermined degree of brake application has been initiated, the parts of the valve device 35 are so designed and adjusted that communication between piping 47 and brake cylinder pipe 39 is not established until a predetermined brake cylinder pressure has been first produced.

*Operation*

The operation of the system disclosed is quite simple. When the brakes are to be applied the handle 38 of the brake valve device 37 is placed in application position and left there until the desired pressure has been established in the brake cylinder 36, whereupon the handle 38 is moved to lap position.

Assuming that the degree of brake application thus established is great enough to require the employment of the traction increaser apparatus, the pressure established below the piston valve 43 will be sufficient to raise this valve to its upper seated positions. Fluid under pressure to the degree established in the brake cylinder 36 will then flow to both the switch device 29 and the cylinder 17. The switch 29 will close the circuit to the traction increaser device 10 and the cylinder 17 will lower the device to its effective position, indicated by the dotted lines 22, where the device will be effective to produce a substantial downward pull on the wheels 4 against the rail 7. This will obviously increase the adhesion between the wheels and rails and permit the full force of the brake application to be effective with a minimum danger of wheel sliding.

When the brakes are released by movement of the handle 38 to release position fluid under pressure will be released simultaneously from the brake cylinder 36, switch 29 and cylinder 17. As soon as the pressure below the piston valve 43 reduces to the point where spring 46 is operative to return the valve to its lower position, final venting from the switch 29 and cylinder 17 will take place via the passage 48, bore 42 and passage 49. The spring 20 will then be effective to raise the traction increaser device 10 to its upper and ineffective position, where it will remain until the next time the brakes are applied to or above the degree which it is deemed essential that the traction increaser apparatus be brought into action.

It will thus be observed that the invention provides for a traction increaser apparatus in which the traction increaser devices are held in a safe ineffective position except when the brakes are applied to a degree requiring additional adhesion, whereupon the traction increaser devices are actuated to their effective position.

While one embodiment of the invention has been illustrated and described in detail, it is apparent that the invention may be embodied in many different forms, and it is intended to embrace all forms included within the spirit and scope of the appended claims.

Having now described my invention what I claim as new and desire to secure by Letters Patent, is:

1. In a traction increaser apparatus for a railway vehicle having a truck supported on wheels through the medium of journal boxes, in combination, a member carried by two longitudinally spaced journal boxes of the truck, a magnetic traction increaser device carried by said member, means for maintaining said traction increaser device positioned above a track rail in an ineffective position and in a deenergized condition, means carried by said member for actuating said traction increaser device toward and within a predetermined distance of a track rail, and means for at the same time energizing said device to cause it to increase the traction between the vehicle wheels and the rail.

2. In a traction increaser apparatus for a railway vehicle having a truck mounted on wheels through the medium of journal boxes and also having a member comprising a part of the truck and being supported on said journal boxes and spaced from a track rail on which the wheels roll at a predetermined fixed distance, in combination, a vertically movable magnetic traction increaser device carried by said member, means for maintaining said traction increaser device in an ineffective position above a track rail, means carried by said member for actuating said traction increaser device to an effective position just above the track rail, means for at the same time energizing the traction increaser device to render it effective to increase the traction between the vehicle wheels and the rail, a fluid pressure operated brake cylinder device for applying the brakes on the vehicle, and means controlled by the pressure in said brake cylinder device for controlling the actuation of said traction increaser device to its effective position and its energization.

3. In a traction increaser device for a railway vehicle, in combination, a pair of wheel-and-axle assemblies, a journal box on the end of each of said assemblies, a rigid member supported on said journal boxes, a magnetic traction increaser device carried by said member and disposed above a track rail, means providing for vertical movement of said traction increaser device, spring means for maintaining said traction increaser device in a raised position over the track rail, a pressure operated cylinder device carried by said rigid member and operative upon increase of pressure therein to lower said traction increaser device toward said rail, means for at the same time energizing said traction increaser device, and means for arresting downward movement of said traction increaser device when it reaches a predetermined point directly above the rail.

4. In a traction increaser apparatus for a vehicle truck having wheel-and-axle assemblies provided with journal boxes, in combination, a rigid member carried by at least two of said journal boxes and provided with apertures therethrough, a traction increaser device having vertically extending rods passing through said apertures in said rigid member, a yoke member connecting the ends of said rods above said rigid member, a lever mechanism connected to said yoke member, spring means acting on said lever mechanism to maintain said traction increaser device in a raised position, and fluid pressure operated means for acting on said lever mechanism to lower said traction increaser device.

CLYDE C. FARMER.